(12) United States Patent  
Raybell et al.

(10) Patent No.: US 8,464,982 B2
(45) Date of Patent: Jun. 18, 2013

(54) SYSTEMS AND METHODS FOR SECURING AND PROTECTING AIRCRAFT LINE REPLACEABLE UNITS WITH STATUS INDICATOR UNDER A PASSENGER SEAT

(75) Inventors: Shawn Raybell, Maple Valley, WA (US); Norikazu Natsume, Mukilteo, WA (US); Stephanie Lightbody, Snohomish, WA (US)

(73) Assignee: Jamco America, Inc., Everett, WA (US)

( * ) Notice: Subject to any disclaimer, the term of this patent is extended or adjusted under 35 U.S.C. 154(b) by 160 days.

(21) Appl. No.: 12/898,135

(22) Filed: Oct. 5, 2010

(65) Prior Publication Data

US 2011/0079682 A1    Apr. 7, 2011

Related U.S. Application Data

(60) Provisional application No. 61/248,756, filed on Oct. 5, 2009.

(51) Int. Cl.
*B64D 11/00* (2006.01)

(52) U.S. Cl.
USPC .................. 244/118.5; 244/118.6; 244/122 R

(58) Field of Classification Search
USPC ...................... 244/118.1, 118.5, 118.6, 122 R
See application file for complete search history.

(56) References Cited

U.S. PATENT DOCUMENTS

| | | |
|---|---|---|
| 4,853,555 A | 8/1989 | Wheat |
| 5,409,186 A | 4/1995 | Chow |
| 5,555,458 A | 9/1996 | Large |
| 5,795,018 A | 8/1998 | Schumacher et al. |
| 6,340,868 B1 | 1/2002 | Lys et al. |
| 6,572,054 B1 | 6/2003 | Smallhorn |
| 6,585,189 B1 | 7/2003 | Smallhorn |
| 6,601,798 B2 | 8/2003 | Cawley |
| 6,619,588 B2 | 9/2003 | Lambiaso |
| 6,644,593 B2 | 11/2003 | Lambiaso |
| 6,743,976 B2 | 6/2004 | Motzigkeit |
| 6,824,104 B2 | 11/2004 | Smallhorn |
| 6,843,681 B2 | 1/2005 | Sanner |
| 6,860,554 B2 | 3/2005 | Lambiaso |
| 6,863,344 B2 | 3/2005 | Smallhorn |
| 6,899,396 B2 | 5/2005 | Bales |
| 6,921,987 B2 | 7/2005 | Marin-Martinod |
| 7,143,978 B2 * | 12/2006 | Smallhorn ................ 244/118.5 |
| 7,188,805 B2 | 3/2007 | Henley et al. |
| 7,221,104 B2 | 5/2007 | Lys et al. |
| 7,503,522 B2 | 3/2009 | Henley et al. |
| 7,525,254 B2 | 4/2009 | Lys et al. |
| 7,598,686 B2 | 10/2009 | Lys et al. |
| 7,610,783 B2 | 11/2009 | Rudduck et al. |
| 7,710,288 B2 | 5/2010 | Seguchi et al. |
| 7,930,004 B2 | 4/2011 | Seil et al. |
| 2003/0076281 A1 | 4/2003 | Morgan et al. |
| 2007/0146998 A1* | 6/2007 | Sarno et al. ................ 361/704 |
| 2007/0182534 A1 | 8/2007 | Gregory |
| 2009/0237245 A1 | 9/2009 | Brinton et al. |

\* cited by examiner

*Primary Examiner* — Timothy D Collins
*Assistant Examiner* — Nicholas McFall
(74) *Attorney, Agent, or Firm* — Vedder Price P.C.

(57) ABSTRACT

Systems and methods of retrofitting a commercial passenger aircraft with a mounting system that secures and protects a line replaceable unit (LRU) are disclosed. An exemplary embodiment is a mounting system for a regulatory compliant passenger power outlet system.

21 Claims, 4 Drawing Sheets

SYSTEMS AND METHODS FOR SECURING AND PROTECTING AIRCRAFT LINE REPLACEABLE UNITS WITH STATUS INDICATOR UNDER A PASSENGER SEAT

PRIORITY CLAIM

This patent application claims the benefit of the filing date of U.S. Provisional Patent Application Ser. No. 61/248,756, filed Oct. 5, 2009, which is hereby incorporated by reference in its entirety.

BACKGROUND OF THE INVENTION

Many passengers of commercial passenger aircraft use their computers and other electrical devices for work or recreational purposes while in flight to their destination. However, use of such electrical devices is limited during long flights which may last longer than the battery life of the passenger's electrical device. Accordingly, commercial passenger aircraft companies have only recently seen the need to provide electrical power to provide power to electronic devices used by its passengers.

Electrical power has been available to the passengers from electrical power outlets located under their passenger seats or in other convenient locations. A passenger power outlet system employs a power conversion device that converts the aircraft power, typically available at 115 volts and at a frequency of 400 hertz (Hz), to the voltage and frequency that is used by the passenger's electrical device, typically at 110-120 volts and at 60 Hz or 50 Hz. A wire is then extended from the power conversion device to the electrical power outlet that is readily accessible by the passenger.

Such prior art passenger power outlet systems attach one or more portions of the passenger power outlet system to the passenger seat and/or to the seat supports. For example, the wiring between the electrical outlet and the power conversion device may be secured to the passenger seat supports and other support structure.

Safety regulations stipulate that the passenger's electrical devices must be shut off during certain phases of flight, such as during takeoff and landing. Accordingly, the passenger's electrical devices should not be drawing power from the passenger power outlet system, and preferably, should be entirely disconnected from the passenger power outlet system. Accordingly, a power-in-use indicator, such as a light or the like, is employed by the passenger power outlet system so that a flight attendant can visually detect use of the passenger power outlet system.

The power-in-use indicator is typically secured to, and/or incorporated into, the aisle-way passenger seat at a location that is readily visible to the flight attendant. Thus, prior to landing or taking off, the flight attendant can walk down the passenger aisle and quickly determine if one or more of the passenger's electrical devices are drawing power from the passenger power outlet system (and thus, may request the passenger to disconnect their electrical device from the passenger power outlet system).

Considerable regulatory overview and approval is required for all aspects of aircraft structure, and particularly modifications made thereto, so as to ensure aircraft safety. In particular, any modification to a passenger seat must be submitted for approval, and then be approved by, one or more appropriate regulatory organizations. Thus, the power-in-use indicator light that is attached to, or secured to, the passenger seat must be pre-approved by the appropriate regulatory organization(s).

During initial fitting of the commercial passenger aircraft with the passenger seats, providing a regulatory compliant and regulatory compliant passenger power outlet system, with the attendant power-in-use indicator light that is attached to the passenger seat, is relatively simple to implement. That is, the regulatory compliant passenger power outlet system is easily installed as part of the process of initially installing the passenger seats into the commercial passenger aircraft.

However, retrofitting existing passenger seats with a passenger power outlet system is relatively more complex and expensive. Further, the passenger power outlet system must receive regulatory approval prior to installation, particularly if one or more components of the passenger power outlet system is secured to, or even if touching, a passenger seat.

An unexpected advance in technology has created an urgent need to retrofit existing commercial passenger aircraft with passenger power outlet systems. The advent of wireless technology, and in particular WiFi technology, allows wireless access to the Internet by IEEE 802.11 compliant devices, such as a laptop computer, a personal device assistant (PDA), a cell phone, a game device, or the like. That is, a passenger can now wirelessly access the Internet through a WiFi hub device that has been installed in the commercial passenger aircraft.

Passengers are willing to pay a premium service charge for wireless Internet access during their flight. However, when the battery life of the passenger's electrical device is substantially less than the duration of the flight, the passenger will likely be reluctant to pay the premium service charge.

Accordingly, there is a need to provide an improved regulatory compliant retrofit passenger power outlet system that is readily installed in an existing operational commercial passenger aircraft so that the commercial passenger aircraft companies can take advantage of this new economic opportunity. Further, it is highly desirable to have a regulatory compliant retrofit passenger power outlet system suitable for immediate installation in commercial passenger aircraft without the need for extensive regulatory oversight and approval of the appropriate regulatory organizations, which may take a considerable amount of time and effort on the part of the supplier of the passenger power outlet system.

SUMMARY OF THE INVENTION

Systems and methods of retrofitting a commercial passenger aircraft with a mounting system that secures and protects a line replaceable unit (LRU) are disclosed An exemplary embodiment is a mounting system for a regulatory compliant passenger power outlet system.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of a line replaceable units (LRUs) mounting system provide for retrofitting a commercial passenger aircraft with a mounting system that secures and protects a line replaceable unit (LRU). LRUs herein refer to systems that provide services to aircraft passengers. For example, an exemplary LRU is a passenger power outlet system that provides a passenger access to electrical power for their electronic device. Other exemplary LRUs include in-flight entertainment systems, passenger data network systems, seat actuation systems, seat massage systems. Within the context of this disclosure, the LRU mounting system 100 is described as an exemplary passenger power outlet system. Other embodiments may provide for mounting of other types of LRUs, including combination LRUs that provide multiple services to the passenger.

Figure 1:
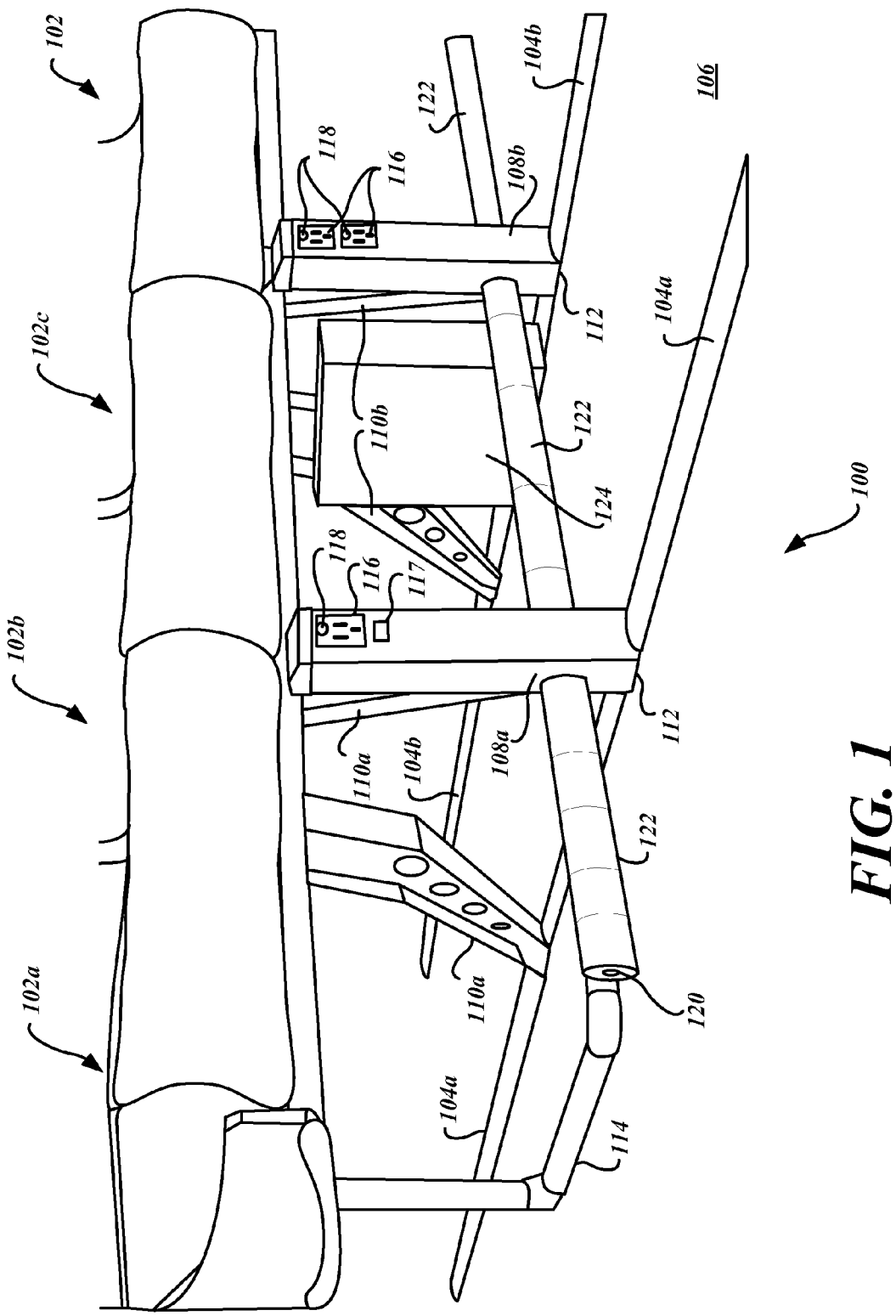
FIG. 1 is a perspective view of an embodiment of a passenger power outlet system installed adjacent to a plurality of passenger seats and secured to the seat tracks located on an aircraft cabin floor.
Figure 2:
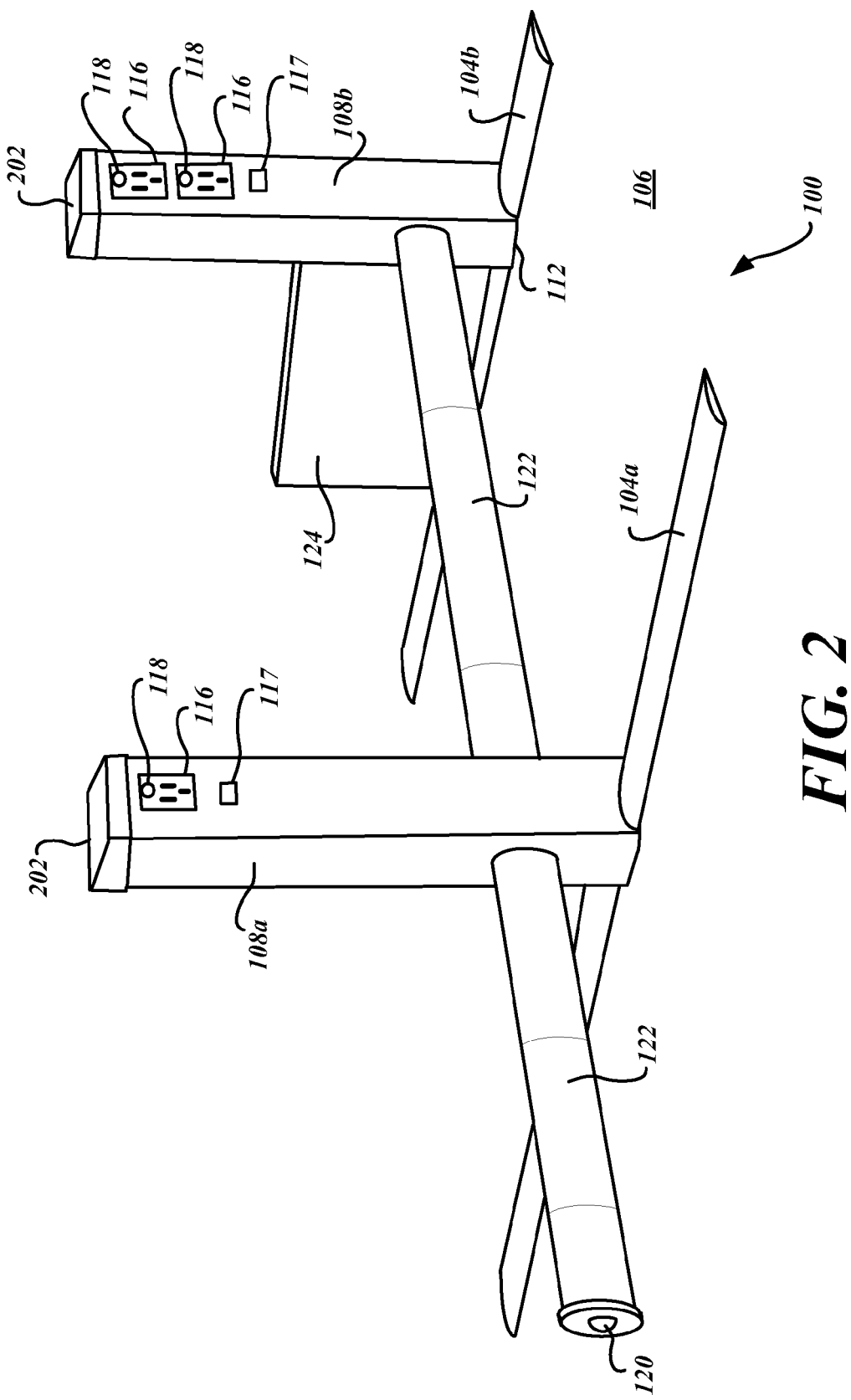
FIG. 2 is a perspective view of the passenger power outlet system prior to installation.

FIG. 1 is a perspective view of an embodiment of a LRU mounting system 100 installed adjacent to a plurality of passenger seats 102a-102c. The LRU mounting system 100 is secured to a plurality of seat tracks 104a, 104b located on an aircraft cabin floor 106. FIG. 2 is a perspective view of the LRU mounting system 100 prior to installation. The exemplary embodiment of the LRU mounting system 100 comprises one or more housing units 108a-108b that, after installation, are disposed below the passenger seats 102a-102c.

The passenger seats 102a-102c are secured to the aircraft cabin floor 106 by attachment to the seat supports 110a, 110b. The seat supports 110a, 110b are secured to the seat tracks 104a, 104b. In the exemplary embodiment, the housing unit 108a is secured to the seat track 104a in front of the seat support 110a, and is therefore between the passenger seats 102a and 102b. The housing unit 108b is secured to the seat track 104b in front of the seat support 110b, and is therefore between the passenger seats 102b and 102c. Accordingly, the housing units 108a-108b are located below the passenger seats 102a-102c and provide convenient access to the passengers.

In some applications, a carry-on baggage restraint bar 114 is disposed below the passenger seats 102 so that passengers sitting behind the passenger seats 102 are able to store and secure their carry-on luggage underneath the passenger seats 102. The carry-on baggage restraint bar 114 is typically secured to lower portions of the passenger seats 102 and/or to the seat supports 110a, 110b.

As noted above, the LRU mounting system 100 is secured to the seat tracks 104a, 104b. Accordingly, the LRU mounting system 100 is independent of (not substantially secured to) the passenger seats 102a-102c, the seat supports 110a, 110b, and/or the carry-on baggage restraint bar 114. Thus, an unexpected advantage realized by embodiments of the LRU mounting system 100 is that it is readily installed in existing aircraft.

Further, since embodiments of the LRU mounting system 100 are not secured to the passenger seats 102, the seat supports 110a, 110b, and/or the carry-on baggage restraint bar 114, the LRU mounting system 100 may be partially, or totally, exempt from regulator oversight pertaining to the aircraft passenger seats 102 and/or the aircraft cabin floor 106. Thus, the regulatory approval process, if any, for approval for installation of the LRU mounting system 100 in commercial passenger aircraft is significantly less complex, time consuming, and expensive than the regulatory approval process for legacy passenger power systems since such legacy power systems are secured to and/or are integrated into the structure of the passenger seats 102.

As described herein, the meaning of the phrase "the LRU mounting system 100 is not substantially secured to the passenger seats 102a-102c and/or the seat supports 110a, 110b" imparts the intent that the various portions of the LRU mounting system 100 do not substantially couple to, or substantially touch, the passenger seats 102a-102c and/or the seat supports 110a, 110b to an extent that would otherwise require regulatory oversight. Thus, the LRU mounting system 100 does not significantly affect the physical structure of the passenger seats 102a-102c and/or the seat supports 110a, 110b in a manner that would alter the structural integrity of the passenger seats 102a-102c and/or the seat supports 110a, 110b, or in a manner that would affect passenger safety. De minimus type securing to or contact with the passenger seats 102a-102c and/or the seat supports 110a, 110b does not significantly affect the structural integrity of the passenger seats 102a-102c and/or the seat supports 110a, 110b, or does not significantly affect passenger safety. Accordingly, such de minimus type securing to or contact with the passenger seats 102a-102c and/or the seat supports 110a, 110b would not be subject to, if any, significant regulatory oversight. In some embodiments of the LRU mounting system 100, de minimus type securing to or contact with the passenger seats 102a-102c and/or the seat supports 110a, 110b may occur.

An exemplary housing unit 108 includes at least one power outlet 116 or other device coupler that is readily accessible by a passenger sitting in one of the passenger seats 102a-102c. In embodiments that have the power outlet 116, an optional power available indicator light 118 may be provided to indicate to the passenger or another individual, such as a flight attendant or service person, that the exemplary power outlet 116 is actively sourced to a power supply (not shown). In alternative embodiments, other types of passenger-accessible device couplers 117, such as a universal serial bus (USB) port or the like, reside in the housing unit 108. The passenger-accessible device coupler 117 is configured to provide communications to an electronic device of a passenger. Indicator devices may be included on the housing unit 108 to indicate that the corresponding LRU system is available for passenger use. The indicator device may indication communications by the electronic device, and/or may indicate that the electronic device is coupled to the passenger-accessible device coupler 117.

The housing units 108a, 108b include a structural attachment point 112 that houses a fastener (not shown) that is configured to fastenably couple to connectors (not shown) of the seat tracks 104a, 104b. Once the structural attachment point 112 is secured to the seat tracks 104, the LRU mounting system 100 is rigidly and securely fastened to the aircraft cabin floor 106. Thus, portions of the LRU mounting system 100 cannot be bent or dislodged by the passenger or carry-on luggage that may come in contact with the LRU mounting system 100.

Embodiments of the LRU mounting system 100 include a system status indicator device 120 that indicates use of the power outlet 116 and/or device coupler 117. The status indicator device extension member 122 is secured, at a first end, to the housing unit 108. The system status indicator device 120 is disposed an opposing second end of the system status indicator device extension member 122. For example, but not limited to, an exemplary system status indicator device 120 indicates when one or more of the power outlets 116 or other device couplers 117 are in use.

In an exemplary embodiment, the system status indicator device 120 indicates physical coupling of an electronic device to one of the power outlets 116 or other device coupler 117. Alternatively, or additionally, the system status indicator device 120 indicates that the electronic device is receiving a service from the LRU, such as when one of the power outlets 116 is delivering electrical power to an electronic device coupled thereto.

Preferably, the system status indicator device 120 is a light, lamp, light emitting diode (LED), mechanical flag, or other suitable visual indicating means. A suitable electrical wire, connection, cable, or the like disposed within a cavity of the housing units 108 and/or the system status indicator device extension member 122 provides coupling to suitable sensors that sense use of the power outlets 116 or other device couplers, and/or that provides power for illumination or actuation of the system status indicator device 120.

The system status indicator device extension member 122 extends outwardly from the housing unit 108. Thus, the system status indicator device 120 can be disposed in a location, such as under an aisle-way passenger seat 102, so as to be readily visible to a flight attendant who is conducting a visual inspection of the aircraft cabin and the passengers, such as during a pre-take off or pre-landing inspection.

Preferably, the system status indicator device extension member 122 is a rigid member that is securely fastened to, or part of, the housing unit 108. As illustrated in FIG. 1, the system status indicator device extension member 122 extends outwardly from the housing unit 108 at a distance that generally corresponds to the location of the passenger aisle in the aircraft cabin. The system status indicator device extension member 122 does not extend so far into the passenger aisle so as to be a hazard to the passengers and the flight attendants as they move about the passenger cabin. On the other hand, the system status indicator device extension member 122 extends far enough towards the passenger aisle so that the system status indicator device 120 is readily visible to the flight attendant as they are walking down the passenger aisle.

Preferably, the system status indicator device extension member 122 is sufficiently rigid such that it cannot be easily bent or dislodged by a passenger or carry-on luggage that may inadvertently come in contact with the system status indicator device extension member 122. In one application, the system status indicator device extension member 122 is aligned with and is adjacent to the carry-on baggage restraint bar 114 disposed below the passenger seats 102a-102c. Accordingly, the system status indicator device extension member 122 may be unobtrusively disposed below the aisle-way passenger seat 102a. In another application, the system status indicator device 120 extend towards the passenger cabin wall, and optionally upward along the passenger cabin wall, so as to be readily visible to the flight attendant.

Preferably, an embodiment of the LRU mounting system 100 is configured to install under three passenger seats 102a-102c. Accordingly, the LRU mounting system 100 includes two housing units 108a, 108b, each attached to a respective seat track 104a, 104b, running parallel to each other along the length of the passenger cabin floor 106. Depending upon the number of passenger seats in a particular section of the commercial passenger aircraft, embodiments of the LRU mounting system 100 may use one or more of the housing units 108a-108b, and/or an additional member, to secure to any number of available seat tracks.

One or more of the housing units 108a, 108b may be slidably adjustable along the length of the system status indicator device extension member 122. Thus, adjustments may be made in the relative spacing between adjacent ones of the housing units 108a, 108b so that the LRU mounting system 100 can be readily adjusted so as to be secured to the seat tracks 104a, 104b. Accordingly, a single production model of the LRU mounting system 100 may be suitable for installation in a variety of commercial passenger aircraft which have different arrangements and/or numbers of passenger seats 102, and/or which have different arrangement of the associated seat tracks 104a, 104b. Once the slidably adjustable housing units 108a, 108b are positioned so as to be aligned with the respective seat tracks 104a, 104b, a securing means may be optionally provided to secure the slidably adjustable housing units 108a, 108b to the system status indicator device extension member 122. For example, a set screw, adjustable collar, or other suitable fastener may be used to secure the slidably adjustable housing units 108a, 108b to the system status indicator device extension member 122.

Some embodiments of the LRU mounting system 100 may be coupled to, or may include as an integral component, a power supply enclosure 124. The power supply enclosure 124 is configured to receive electrical power from the aircraft's power system (not shown) and provide connectivity to the other device couplers or power outlets 116, preferably via suitable electrical wires, connections, cables, or the like (not shown) disposed within cavities of the housing units 108 and/or within the system status indicator device extension member 122.

The power supply enclosure 124, in an exemplary embodiment, comprises a transformer (not shown) that receives power at the voltage and frequency provided by the aircraft's power system. The received power is converted by the transformer to a voltage and frequency that is suitable for use by the passenger's electronic devices. For example, but not limited to, the transformer may convert the received power to a nominal voltage of 110 volts and a nominal frequency of 60 Hz or 50 Hz (depending upon the geographic location of use of the commercial passenger aircraft). Preferably, the power supply enclosure 124 and the components therein have already received regulatory approval for installation and use in a commercial passenger aircraft.

Some embodiments may employ a molded or extruded material to form the housing units 108. Thus, an end cap 202 may be used to cover the exposed ends of the housing unit 108 structure. The end cap 202 may be soft, semi-rigid, or rigid. Further, the end cap 202 may be decorative.

Figure 3:
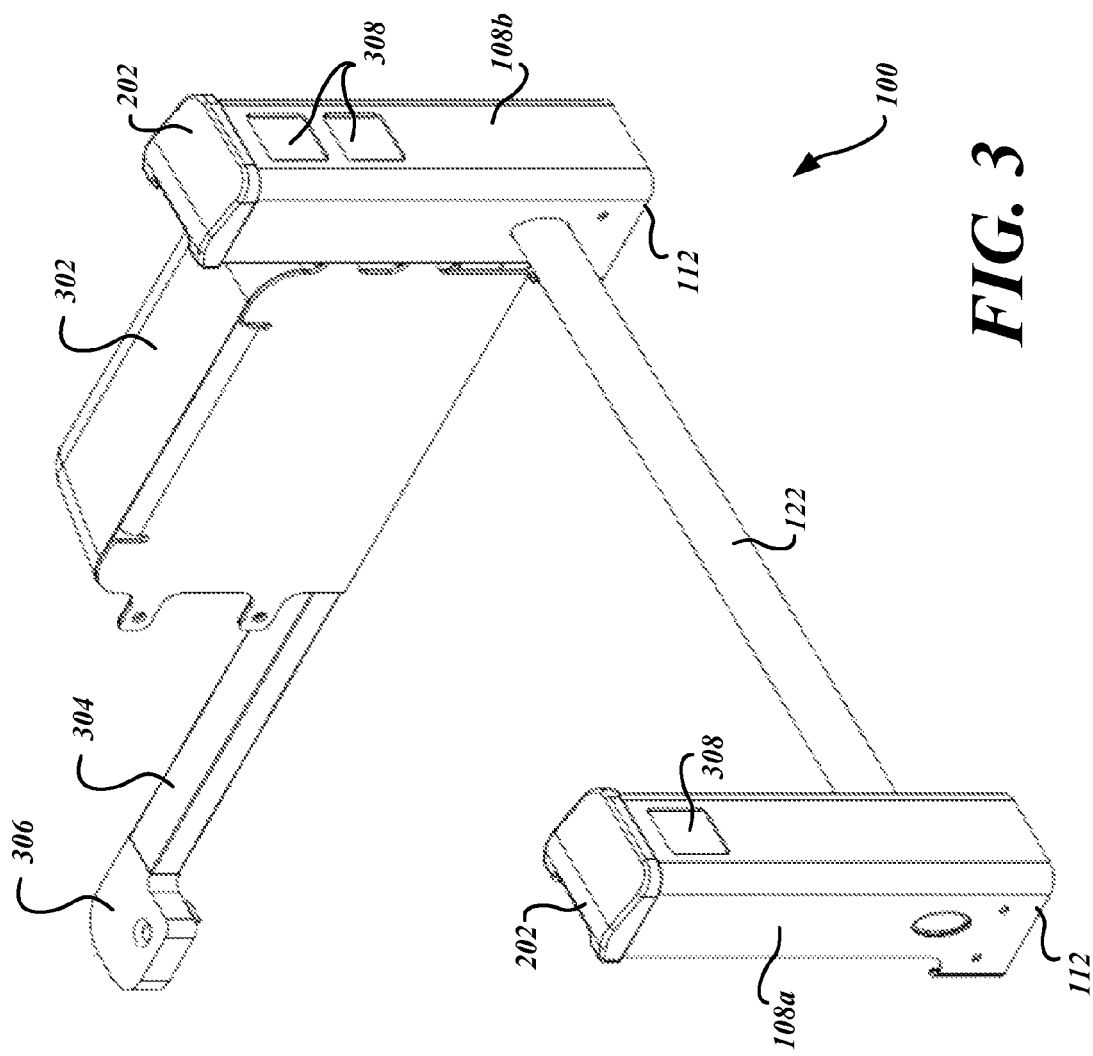
FIGS. 3 and 4 are various perspective views of an embodiment of the passenger power outlet system.
Figure 4:
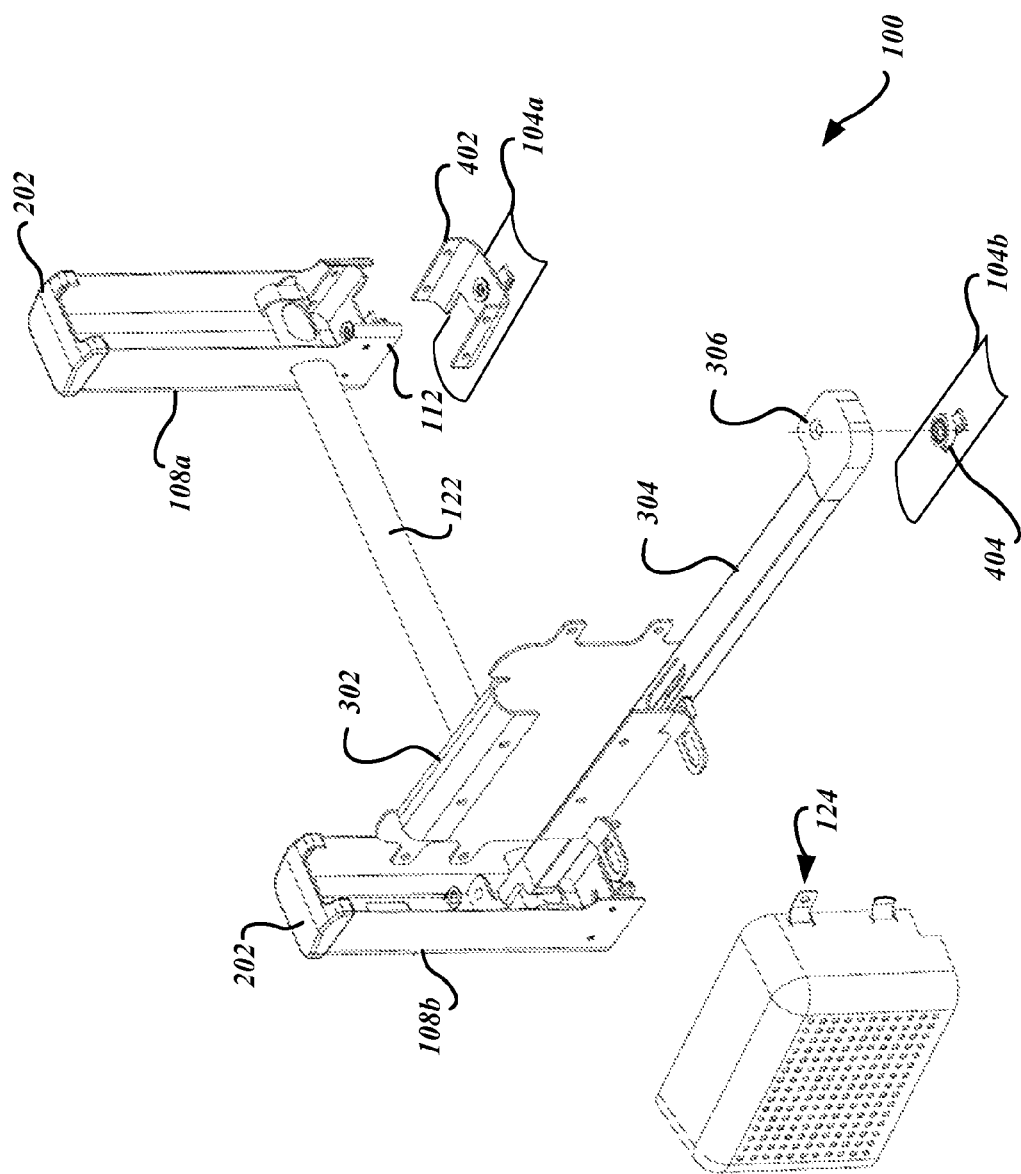

FIGS. 3 and 4 are a perspective views of an embodiment of the LRU mounting system 100. A shroud cover 302 is configured to secure an embodiment of the LRU mounting system 100 to the power supply enclosure 124. In one application, the power supply enclosure 124 is been secured to the seat tracks 104a, 104b using a suitable connector 404. Thus, the shroud cover 302 facilitates integration of a LRU mounting system 100 with a legacy power supply enclosure 124 that is installed in conjunction with, or that has already been installed, in the commercial passenger aircraft. Preferably, the power supply enclosure 124 and the components therein, such as the transformer, has already received regulatory approval for installation in a commercial passenger aircraft.

Embodiments of the LRU mounting system 100 may include a raceway 304 that includes a cavity therein that is configured to receive a suitable electrical wire, connection, cable, or the like that electrically couples components of the power supply enclosure 124 (such as the transformer) to suitable electrical access points (not shown) of the aircraft's power system. The raceway 304 may be secured to a selected one of the housing units 108. Suitable connection points and/or connectors may be provided along the length of the raceway 306 that can be used to secure the raceway 304 to the seat tracks 104.

In some embodiments, the LRU may be part of a wireless data system, such as a Wi-Fi system, that provides data a communication service to the passenger's electronic device. An antenna, and or other components, that receives communications from one or more electronic devices may be housed within the LRU mounting system 100. Optionally, a data connector may extend through the raceway 304 and the raceway end cap 306.

A suitable raceway end cap 306 may be provided at, or coupled to, the end of the raceway 304 to facilitate the extension of the electrical wire, connection, cable or the like through a connector 404 on the floor tracks 104*a*, 104*b*. The raceway end cap 306 may optionally include a suitable connection point and/or connector for securing to a connector 402 of the seat tracks 104.

An unexpected advantage of the shroud cover 302 and/or the raceway 304 is that they may be secured without contacting the passenger seats 102 or the seat supports 110*a*, 110*b*, and may be secured without the need for cutting or drilling holes into the aircraft cabin floor 106. Thus, the need for regulatory oversight may be reduced, or possibly eliminated, when compared to legacy power systems that require contact and/or modification of the passenger seats 102, the seat supports 110*a*, 110*b*, and/or the aircraft cabin floor 106.

Some embodiments may employ a molded or extruded material to form the housing units 108. Accordingly, suitable apertures 308 may be formed in the housing units 108 that are configured to receive and secure the power outlets 116 or other device couplers, which have preferably already received regulatory approval for installation and use in a commercial passenger aircraft.

Some embodiments of the LRU mounting system 100 may additionally include other types of connectors on the housing units 108*a*-108*b* that provide for selected types of communication to a user device. For example a communication connection (not shown) supporting a modem, an ethernet, a LAN (local area network), or the like may be located so that the passenger can conveniently couple their electronic device to the communication connection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A mounting system for securing line replaceable units (LRUs) of an aircraft passenger cabin system, comprising:
    at least one housing unit secured to a floor track on a cabin floor of the aircraft positioned in line with the floor track such that the top of each housing is below one or more passenger seats, wherein the at least one housing unit is not directly secured to the one or more passenger seats or to corresponding seat supports of each passenger seat;
    a system status indicator device extension bar secured to the housing unit that extends substantially to a passenger aisle of the commercial passenger aircraft; and
    a system status indicator device located at an end of the system status indicator device extension member, wherein the system status indicator device is visible to a person traversing the passenger aisle of the aircraft.

2. The system of claim 1, wherein the system status indicator device is a light.

3. The system of claim 1, wherein the housing unit is not in contact with at least one of the passenger seats and the seat supports.

4. The system of claim 1, wherein the system status indicator device extension member is not in contact with at least one of the passenger seats and the seat supports.

5. The system of claim 1, further comprising:
    a raceway secured to a floor track on a cabin floor of the commercial passenger aircraft housing a connection residing in the housing unit; and
    a raceway end cap at an end of the raceway facilitating extension of the connection through a connector on the floor track.

6. The system of claim 1, wherein the LRU is a commercial aircraft passenger power outlet system, wherein the housing unit is an electrical power outlet housing unit, and wherein the system status indicator device is a power-in-use indicator device.

7. A mounting system for securing a commercial aircraft passenger power outlet system, comprising:
    at least one outlet housing unit secured to a floor track on a cabin floor of the commercial aircraft that is positioned in line with the floor track such that the top of each housing is below one or more passenger seats and the at least one outlet housing unit is not directly secured to the one or more passenger seats or a corresponding seat support of each passenger seat, and
    at least one power outlet secured to each outlet housing unit providing power to an electronic device of a passenger;
    a power-in-use indicator device extension bar with a first end secured to the housing unit that extends substantially to a passenger aisle of the commercial passenger aircraft; and
    a power-in-use indicator device located at a second end of the power-in-use indicator device extension member that is visible to a person traversing the passenger aisle of the commercial aircraft, and wherein the power-in-use indicator device indicates power use.

8. The system of claim 7, wherein the power-in-use indicator device is a light.

9. The system of claim 7, wherein the outlet housing unit is not in contact with at least one of the passenger seats and the seat supports.

10. The system of claim 7, wherein the power-in-use indicator device extension member is not in contact with at least one of the passenger seats or the seat supports.

11. An aircraft line replaceable unit (LRU) system, comprising:
    a plurality of aircraft passenger seats adjacently mounted along a passenger aisle by a plurality of seat supports, wherein each of the seat supports are secured to one of a plurality of floor tracks on a cabin floor of the aircraft;
    an outlet housing unit secured to the floor track and mounted to and positioned in line with the floor track such that the top of each housing is below the aircraft passenger seats, wherein the outlet housing unit is mounted to the floor track and is not directly secured to the aircraft passenger seats or the seat supports;
    a power-in-use indicator device extension bar with a first end secured to the housing unit that extends substantially to a passenger aisle of the aircraft; and
    an indicator device located at an opposing second end of the power-in-use indicator device extension member that is visible to a person traversing the passenger aisle of the aircraft to indicate use of an electronic device coupled to the outlet housing unit.

12. The LRU system of claim 11, further comprising:
    at least one power outlet secured the outlet housing unit that provides power to an electronic device of a passenger, wherein the indicator device indicates power use by the electronic device coupled to the power outlet.

13. The LRU system of claim 12, further comprising:
    a power supply enclosure mounted to the floor track, wherein a transformer residing in the power supply enclosure receives electrical power from a power system of the aircraft and converts the power to a voltage and frequency used by the electronic device coupled to the power outlet.

14. The LRU system of claim 11, further comprising:
at least one passenger-accessible device coupler disposed in the outlet housing unit, and configured to provide communications to an electronic device,
wherein the indicator device indicates the status of a communication with the electronic device coupled to the passenger-accessible device coupler.

15. The LRU system of claim 14, wherein the passenger-accessible device coupler is a universal serial bus (USB) port.

16. The LRU system of claim 11, further comprising:
a carry-on baggage restraint bar disposed below the aircraft passenger seats, wherein the outlet housing unit is mounted to the floor track and is not directly secured to the carry-on baggage restraint bar.

17. A mounting system for securing a plurality of line replaceable units (LRUs) of an aircraft passenger cabin system, comprising:
at least one housing unit secured to a floor track on a cabin floor of the aircraft positioned in line with the floor track such that the top of each housing is below one or more passenger seats;
at least one power receptacle on the housing unit;
an electrical power supply housing unit positioned in line with the floor track and behind one of the at least one housing units; and
an extension bar connecting the least one housing unit to a second housing unit,
wherein,
the housing unit is not directly secured to a passenger seat or a corresponding passenger seat support on the passenger seat, and
the extension bar extends substantially across the distance between two passenger seat legs.

18. The mounting system of claim 17 wherein the power receptacle is a USB connector.

19. The mounting system of claim 17 wherein the power receptacle is a standard line voltage receptacle.

20. The mounting system of claim 17 wherein the housing unit includes a first standard line voltage receptacle and a second USB power connector.

21. The mounting system of claim 17 including a transformer residing in the electrical power supply housing unit that receives electrical power from a power system of the aircraft and converts the power to a voltage and frequency used by the electronic device coupled to the power outlet.

* * * * *